US008617712B2

(12) United States Patent
Wu

(10) Patent No.: US 8,617,712 B2

(45) Date of Patent: Dec. 31, 2013

(54) BIARYL POLYCARBONATE INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/196,141

(22) Filed: Aug. 2, 2011

(65) Prior Publication Data

US 2013/0034733 A1 Feb. 7, 2013

(51) Int. Cl.
*B32B 27/28* (2006.01)

(52) U.S. Cl.
USPC ........... 428/412; 428/421; 428/422; 428/447; 428/473.5

(58) Field of Classification Search
USPC ....................... 428/412, 421, 422, 447, 473.5
See application file for complete search history.

(56) References Cited

U.S. PATENT DOCUMENTS

| | | | | |
|---|---|---|---|---|
| 4,411,977 | A * | 10/1983 | Tarumi et al. | 430/125.33 |
| 5,525,446 | A * | 6/1996 | Sypula et al. | 430/47.4 |
| 5,601,913 | A * | 2/1997 | Ohtani et al. | 428/323 |
| 5,978,639 | A | 11/1999 | Masuda et al. | |
| 6,139,784 | A | 10/2000 | Oshima et al. | |
| 6,397,034 | B1 | 5/2002 | Tarnawskyj et al. | |
| 6,586,556 | B2 * | 7/2003 | Kratschmer et al. | 528/196 |
| 7,031,647 | B2 | 4/2006 | Mishra et al. | |
| 7,067,457 | B2 * | 6/2006 | Foster et al. | 503/227 |
| 7,130,569 | B2 | 10/2006 | Goodman et al. | |
| 7,139,519 | B2 | 11/2006 | Darcy, III et al. | |
| 7,781,133 | B2 | 8/2010 | Wu et al. | |
| 2006/0216497 | A1 * | 9/2006 | Torikoshi et al. | 428/323 |
| 2007/0082147 | A1 * | 4/2007 | Teranishi et al. | 428/32.66 |
| 2007/0178312 | A1 * | 8/2007 | Miura et al. | 428/412 |
| 2008/0240802 | A1 * | 10/2008 | Nakura | 399/313 |
| 2009/0326184 | A1 * | 12/2009 | Hikosaka et al. | 528/219 |

OTHER PUBLICATIONS

Buschow, K.H. Jürgen; Cahn, Robert W.; Flemings, Merton C.; Ilschner, Bernhard; Kramer, Edward J.; Mahajan, Subhash (2001). Encyclopedia of Materials—Science and Technology, vols. 1-11. (pp. 7150-7152). Elsevier.*

* cited by examiner

*Primary Examiner* — Callie Shosho
*Assistant Examiner* — John Freeman
(74) *Attorney, Agent, or Firm* — Eugene O. Palazzo

(57) ABSTRACT

An intermediate transfer member that includes biaryl polycarbonates, an optional polysiloxane, and an optional conductive filler component.

6 Claims, 1 Drawing Sheet

BIARYL POLYCARBONATE INTERMEDIATE TRANSFER MEMBERS

This disclosure is generally directed to an intermediate transfer member that includes biaryl polycarbonates, and an intermediate transfer member that is comprised of a mixture of a biaryl polycarbonate, an optional polysiloxane, and an optional conductive component.

BACKGROUND

In a typical electrostatographic reproducing apparatus, a light image of an original to be copied is recorded in the form of an electrostatic latent image upon a photosensitive member and the latent image is subsequently rendered visible by the application of thermoplastic resin particles, which are commonly referred to as toner. Generally, the electrostatic latent image is developed with a developer mixture comprised of carrier granules having toner particles adhering triboelectrically thereto, or a liquid developer material, which may include a liquid carrier having toner particles dispersed therein. The developer material is advanced into contact with the electrostatic latent image and the toner particles are deposited thereon in image configuration. Subsequently, the developed image is transferred to a substrate, like paper.

It is advantageous to transfer the developed image to an intermediate transfer web, belt or component, and subsequently transfer with high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential between the imaging member and the intermediate transfer member, the transfer of the toner particles from the imaging member to the intermediate transfer member and the retention thereon should be substantially complete so that, for example, the image ultimately transferred to the image receiving substrate will have a high resolution. It is desirable that substantially one hundred percent of the toner transfer occurs when most or all of the toner particles comprising the image are transferred and little residual toner remains on the surface from which the image was transferred.

Intermediate transfer members are desired that allow for a number of advantages, such as enabling high throughput at modest process speeds, improving registration of the final color toner image in color systems using synchronous development of one or more component colors using one or more transfer stations, and increasing the range of final substrates that can be used. However, a disadvantage of using an intermediate transfer member is that a plurality of transfer steps is required allowing for the possibility of charge exchange occurring between toner particles and the transfer member, which ultimately can lead to less than complete toner transfer. The result is low-resolution images on the image receiving substrate and image deterioration. When the image is in color, the image can additionally suffer from color shifting and color deterioration. In addition, the incorporation of charging agents in liquid developers, although providing acceptable quality images and acceptable resolution due to improved charging of the toner, can exacerbate the problem of charge exchange between the toner and the intermediate transfer member.

A disadvantage relating to the preparation of an intermediate transfer member is that there is usually deposited a separate release layer on a metal substrate, and thereafter, there is applied to the release layer the intermediate transfer member components, and where the release layer allows the resultant intermediate transfer member to be separated from the metal substrate by peeling or by the use of mechanical devices. Thereafter, the intermediate transfer member is in the form of a film, which can be selected for xerographic imaging systems, or the film can be deposited on a supporting substrate like a polymer layer. The use of a release layer adds to the cost and time of preparation, and such a layer can modify a number of the intermediate transfer member characteristics.

For low end xerographic machines and printers that produce about 30 pages or less per minute, thermoplastic intermediate transfer members are usually used because of their low cost. However, the modulus values or break strength of thermoplastic materials, such as certain polycarbonates, polyesters, and polyamides, are relatively low, such as from about 1,000 to 2,000 Mega Pascals (MPa).

High end xerographic machines and printers that generate at least 30 pages per minute, and up to about 75 pages per minute or more, usually utilize intermediate transfer members of thermoplastic polyimides, thermosetting polyimides, or polyamideimides, primarily because of their high modulus of about 3,500 Mpa or more. However, intermediate transfer members using these materials are more expensive in that both the raw material cost and the manufacturing process cost are higher than using thermoplastic polycarbonates, polyesters, and polyamides. Thus, an economical intermediate transfer member possessing high modulus and excellent characteristics for high end machines is desired.

There is a need for intermediate transfer members that substantially avoid or minimize the disadvantages of a number of known intermediate transfer members.

Also, there is a need for intermediate transfer members with excellent break strengths as determined by their modulus measurements, that are readily releasable from substrates, and that possess improved stability with no or minimal degradation for extended time periods, and where the main polymer incorporated into the member possesses high glass transition temperatures, such as for example, from about 180° C. to about 300° C., or greater than about 200° C., such as from about 200° C. to about 400° C., from about 215° C. to about 375° C., or from about 250 to about 375° C., Moreover, there is a need for intermediate transfer member materials that possess rapid release characteristics from a number of substrates that are selected when such members are prepared.

Another need relates to providing seamless intermediate transfer members that have excellent conductivity or resistivity, and that possess acceptable humidity insensitivity characteristics leading to developed images with minimal resolution issues.

Further, there is a need for seamless intermediate transfer members containing components that can be economically and efficiently manufactured.

Additionally there is a need for intermediate transfer members that possesses a suitable stable functional resistivity.

These and other needs are achievable in embodiments with the intermediate transfer members and components thereof disclosed herein.

SUMMARY

Disclosed is an intermediate transfer member comprising a biaryl polycarbonate.

Also disclosed is an intermediate transfer member comprising a layer of a mixture of a biaryl polycarbonate, a poiysiloxane, and a conductive filler component, and wherein said biaryl polycarbonate is represented by at least one of the following formulas/structures wherein m is from about 1 to about 40 mole percent, and n is from about 99 to about 60 mole percent, and X is hydrogen, fluoride, chloride, or bromide
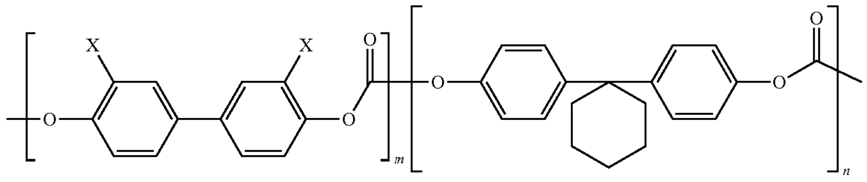
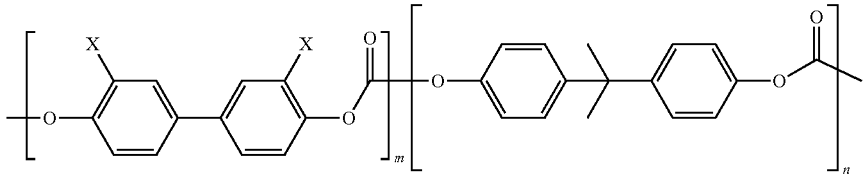
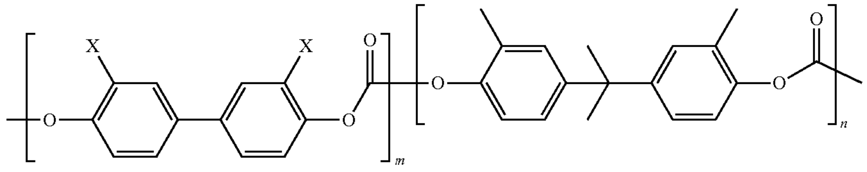
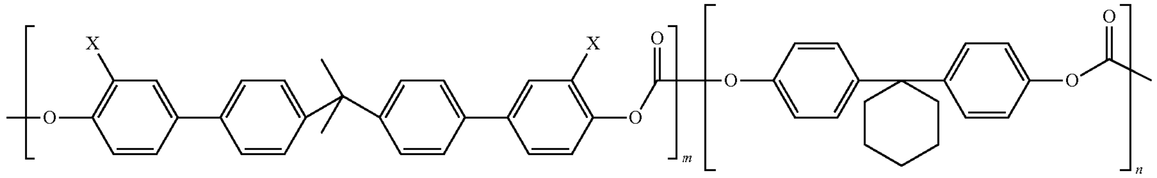
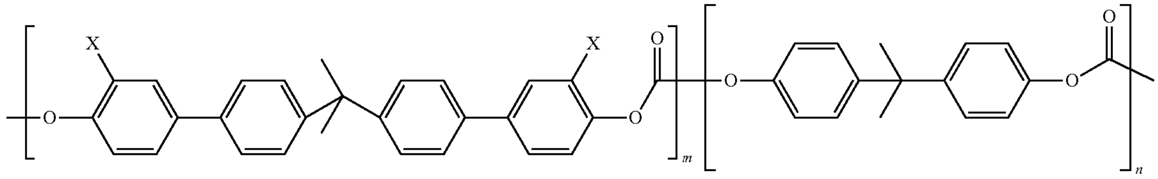
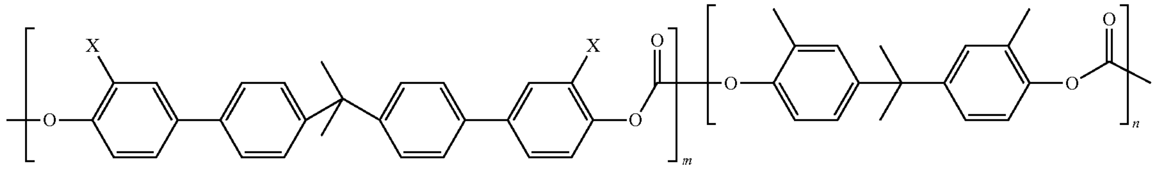
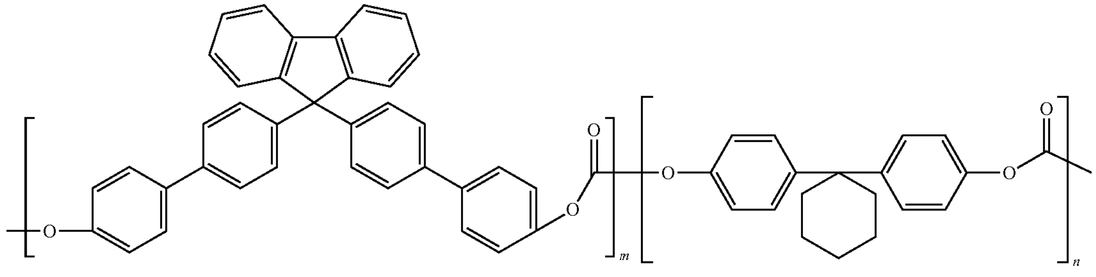
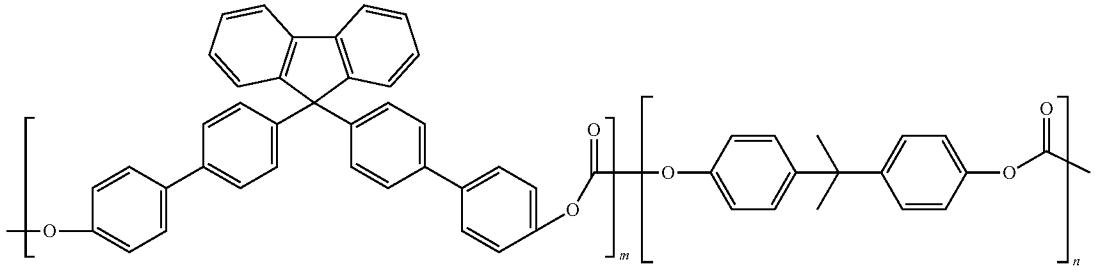

-continued

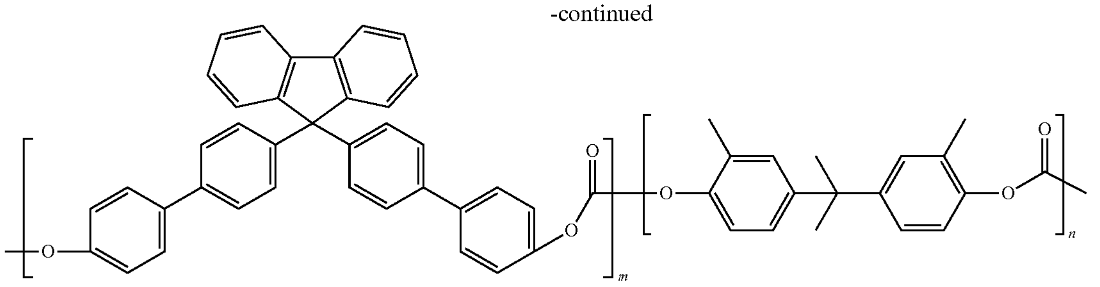

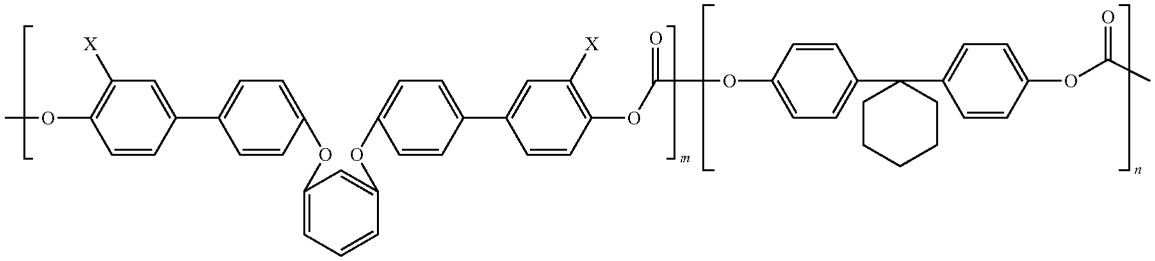

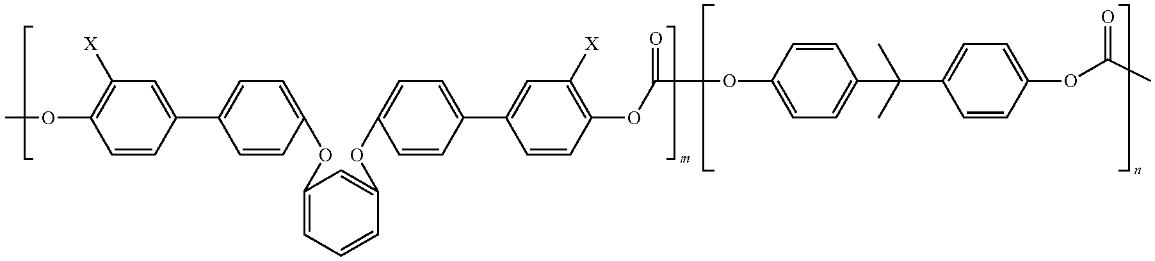

and

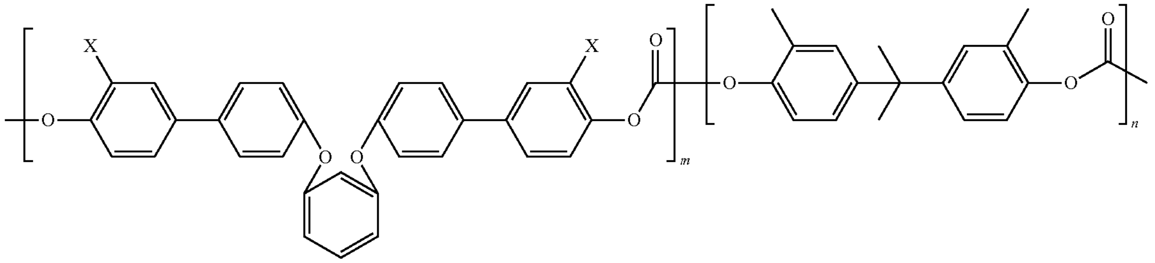

Further disclosed is an intermediate transfer member comprising a mixture of a biaryl polycarbonate, a polysiloxane, and a conductive filler component, and wherein said member possesses a Young's Modulus of from about 2,500 to about 5,000 Mega Pascals, and a break strength of from about 70 to about 150 Mega Pascals and which mixture is readily releasable from a metal substrate.

FIGURES

The following Figures are provided to further illustrate the intermediate transfer members disclosed herein.

EMBODIMENTS

There is provided herein an intermediate transfer member comprising a biaryl polycarbonate that enables or assists in enabling efficient release from a substrate, such as stainless steel, thereby avoiding the need for a separate release layer on the substrate.

More particularly, there is provided herein a seamless intermediate transfer member comprising a mixture, in the configuration of a layer, of a biaryl polycarbonate, a filler, or conductive component, and a polysiloxane.

Also, there is illustrated herein a seamless intermediate transfer member comprising a mixture of a biaryl based polycarbonate, a polysiloxane, and a conductive filler component, and an optional toner release layer.

Figure 1:
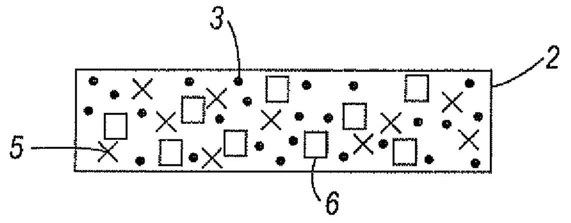
FIG. 1 illustrates an exemplary embodiment of a one-layer intermediate transfer member of the present disclosure.

In FIG. 1 there is illustrated an intermediate transfer member comprising a layer 2, comprised of a biaryl polycarbonate 3, an optional siloxane polymer 5, and an optional conductive component 6.

Figure 2:
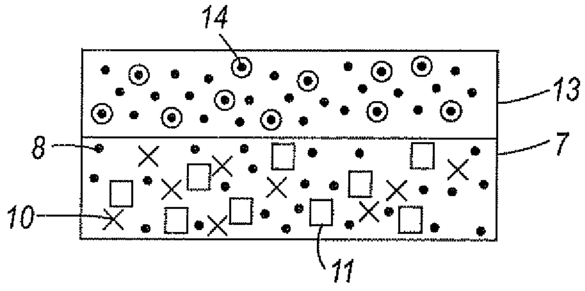
FIG. 2 illustrates an exemplary embodiment of a two-layer intermediate transfer member of the present disclosure.

In FIG. 2 there is illustrated a two-layer intermediate transfer member comprising a bottom layer 7, comprising a biaryl polycarbonate 8, a siloxane polymer 10, and a conductive component 11, and an optional top or outer toner release layer 13, comprising release components 14.

Figure 3:
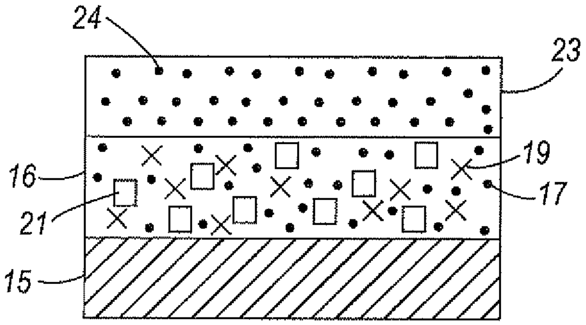
FIG. 3 illustrates an exemplary embodiment of a three-layer intermediate transfer member of the present disclosure.

In FIG. 3 there is illustrated a three-layer intermediate transfer member comprising a supporting substrate 15, a layer thereover 16, comprising a biaryl polycarbonate 17, an optional siloxane polymer 19, and an optional conductive component 21, and an optional release layer 23, comprising toner release components 24.

The intermediate transfer members disclosed herein exhibit excellent release characteristics (self release), where the use of an external release layer present on, for example, a stainless steel substrate is avoided; possess an excellent functional resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, from about $10^{10}$ to about $10^{12}$ ohm/square or from about $3\times10^{10}$ to about $4.5\times10^{10}$ ohm/square; have excellent mechanical strength while permitting the rapid and complete transfer, such as from about 90 to about 100 percent, or from about 95 to about 99 percent transfer of a xerographic developed image; and possess a Young's modulus of, for example, from about 3,800 to about 6,000 Mega Pascals (MPa), from about 3,000 to about 5,500 MPa, from about 3,600 to about 6,000 MPa, from about 3,500 to about 5,000 MPa, from about 3,000 to about 5,000 MPa, from about 4,800 to about 5,000 MPa, from about 2,500 to about 5,000 MPa, or from about 3,700 to about 4,000 MPa; have a break strength of from about 70 to about 180 MPa, from about 70 to about 150 MPa, from about 100 to about 140, or from about 100 to about 120 MPa, in combination with a high glass transition temperature, ($T_g$), for the biaryl polycarbonate of from about 200 to about 400° C., from about 250 to about 375° C., from about 215 to about 375° C., or from about 180 to about 300° C.

Self-release characteristics without the assistance of any external sources, such as prying devices, permit the efficient, economical formation, and full separation, such as from about 95 to about 100 percent, or from about 97 to about 99 percent separation of the disclosed intermediate transfer members from substrates, such as steel, upon which the members are initially prepared in the form of a film. Self-release also avoids the need for release materials and separate release layers on the metal substrates. The time period to obtain the self-release characteristics varies depending, for example, on the components selected for the intermediate transfer members disclosed herein. Generally, however, this time period is from about 1 to about 60 seconds, from about 1 to about 35 seconds, from about 1 to about 15 seconds, from about 1 to about 10 seconds, or from 1 to about 5 seconds, and in some instances less than about 1 second.

The intermediate transfer members of the present disclosure can be provided in any of a variety of configurations, such as a one-layer configuration, or in a multi-layer configuration, including, for example, a top release layer. More specifically, the final intermediate transfer member may be in the form of an endless flexible belt, a web, a flexible drum or roller, a rigid roller or cylinder, a sheet, a drelt (a cross between a drum and a belt), an endless seamed flexible belt, a seamless belt (that is with an absence of any seams or visible joints in the members), and the like.

Biaryl Polycarbonates

Generally the biaryl polycarbonates selected for the intermediate transfer members disclosed herein comprises the following moiety in a polymeric chain

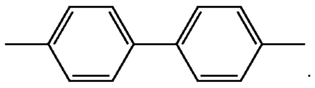

The aryl groups in the biaryl polycarbonates can be substituted or unsubstituted, as desired for specific properties. Examples of biaryl polycarbonates selected for the intermediate transfer members illustrated herein, which biaryl polycarbonates are believed to be available from Mitsubishi Gas Chemical Company, or can be prepared as illustrated in U.S. Pat. Nos. 7,125,951 and 7,687,584, the disclosures of which are totally incorporated herein by reference, are represented by at least one of the following formulas/structures it being known that each of the lines or bonds thereof free of specific groups represent methyl groups, hydrogens, or a combination of hydrogens and methyl groups as appropriate to satisfy the valence chemistry

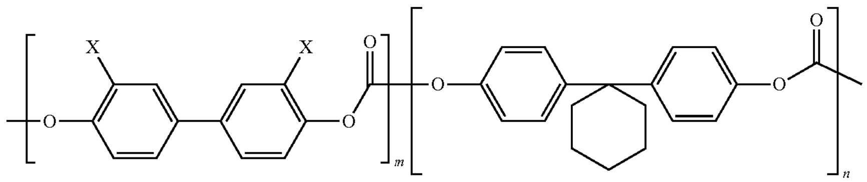

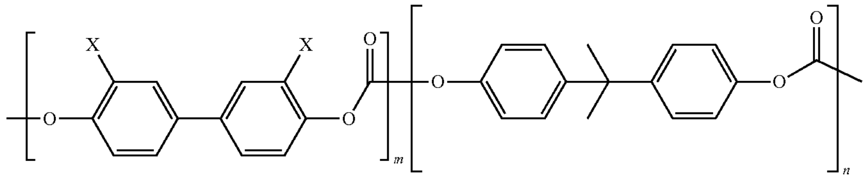

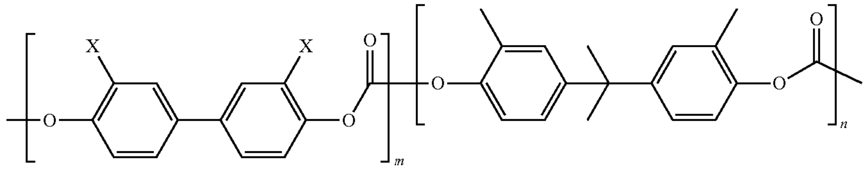

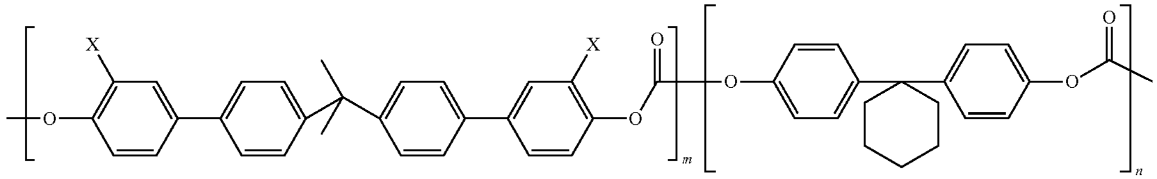

-continued
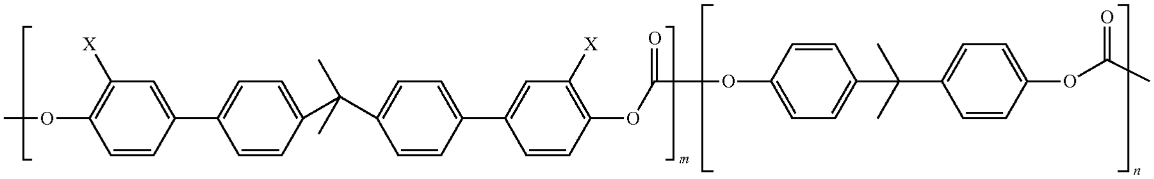
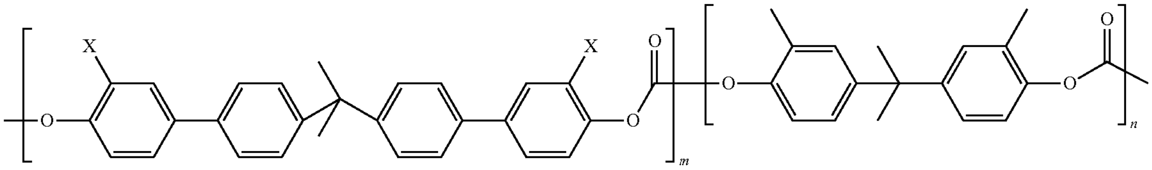
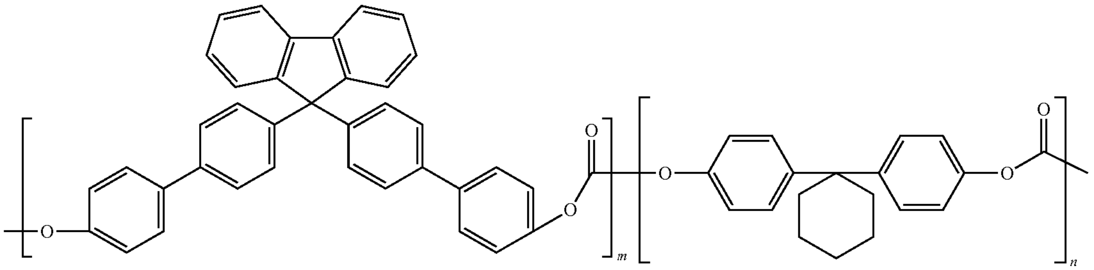
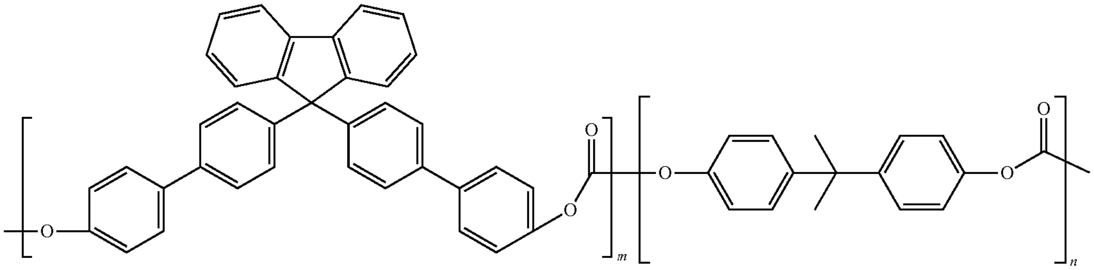
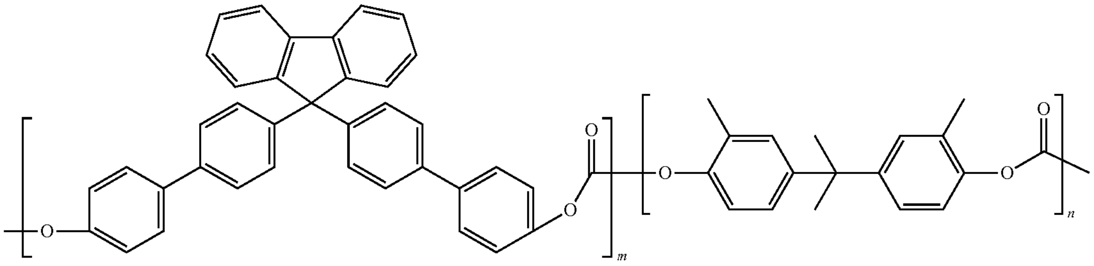
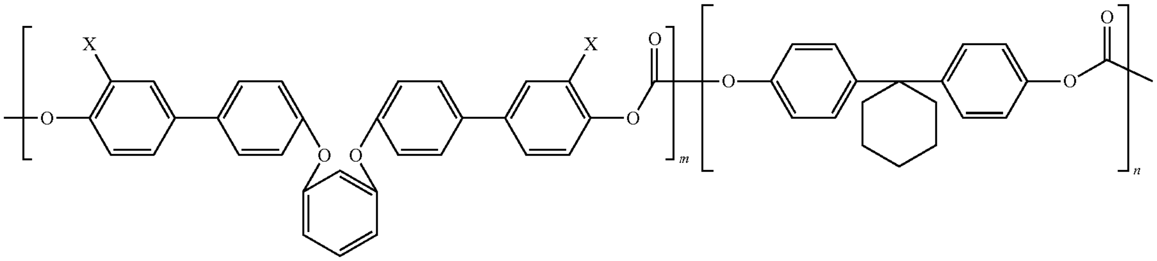
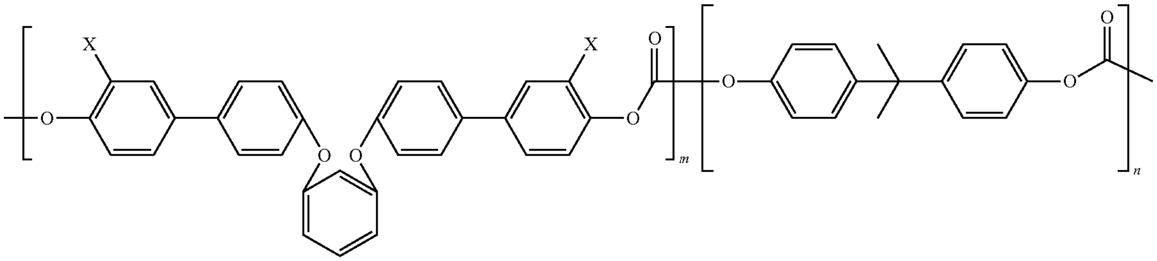
and -continued

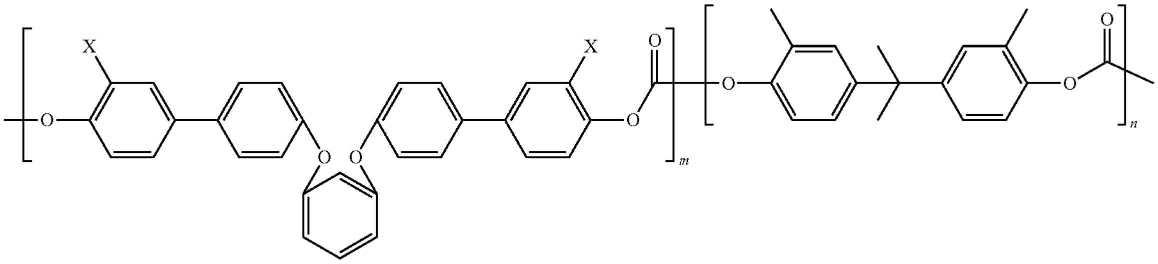

wherein X is hydrogen, or a halogen of fluoride, bromide, or chloride; m is from about 1 to about 40 mole percent, from about 10 to about 30 mole percent, from about 15 to about 25 mole percent, from about 5 to about 35 mole percent or from about 6 to about 20 mole percent; n is from about 60 to about 99 mole percent, from about 70 to about 90 mole percent, from about 75 to about 85 mole percent, from about 65 to about 95 mole percent, or from about 80 to about 99 mole percent, and wherein the total of m and n is about 100 mole percent; wherein m is from about 2 to about 30 mole percent, and n is from about 70 to about 98 mole percent, or wherein m from about 3 to about 20 mole percent, and n is from about 80 to about 97 mole percent. The mole percent values illustrated herein were determined by NMR analysis.

The biaryl polycarbonates illustrated herein possess, for example, a number average molecular weight of from about 10,000 to about 100,000, from about 20,000 to about 75,000, from about 30,000 to about 60,000, from about 35,000 to about 50,000, or from about 5,000 to about 100,000 as determined by known analytic processes, such as by Gel Permeation Chromatography (GPC) analysis. The weight average molecular weight of the biaryl polycarbonates is for example, from about 15,000 to about 500,000, from about 30,000 to about 300,000, from about 40,000 to about 200,000, or from about 8,000 to about 300,000 as determined by known analytic processes, such as by Gel Permeation Chromatography (GPC) analysis. Mole percent, or molar percent, refers in embodiments of the present disclosure to the ratio of the moles of the specific monomer to the total moles of the monomers in the biaryl polycarbonate polymer.

Specific examples of biaryl polycarbonates selected for the intermediate transfer member mixtures illustrated herein can be represented by the following formulas/structures, which were obtained from Mitsubishi Gas Chemical Company, Inc. as an experimental sample designated as BP20BPA80 polycarbonate

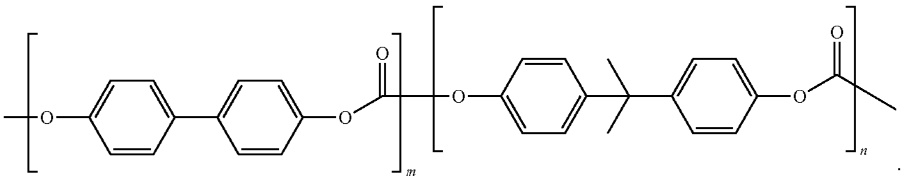

where m is about 20 mole percent, and n is about 80 mole percent, the number average molecular weight is about 38,000; biaryl polycarbonates represented by the following formulas/structures

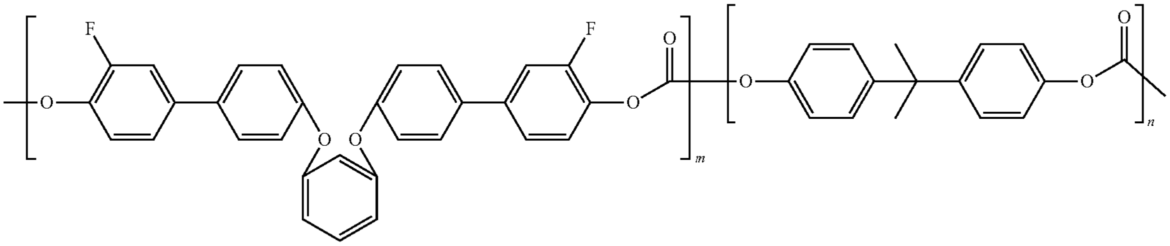

where m is about 20 mole percent, and n is about 80 mole percent, the number average molecular weight is about 8,000, and the weight average molecular weight is about 20,000, obtained from South Dakota School of Mines and Technology; biaryl polycarbonates represented by the following formulas/structures, and the like, and mixtures thereof, wherein m and n are as illustrated herein The biaryl polycarbonates can be present in the intermediate transfer member in an amount of about 100 percent. In embodiments, the biaryl polycarbonates can be present in the intermediate transfer member in the ratios as illustrated herein, and in various effective amounts, such as for example, from about 50 to about 90 weight percent, from about 70 to about 85 weight percent, from about 65 to about 95 weight percent, from about 60 to about 95 weight percent, from about 80 to about 90 weight percent, or from about 80 to about 85 weight percent, based on the total of components or ingredients present.

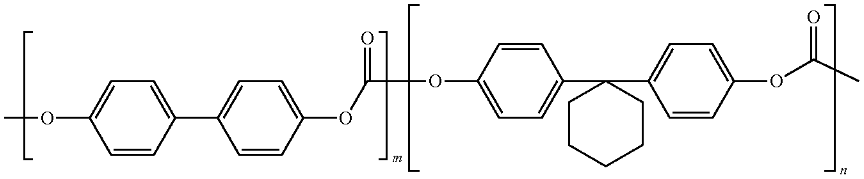

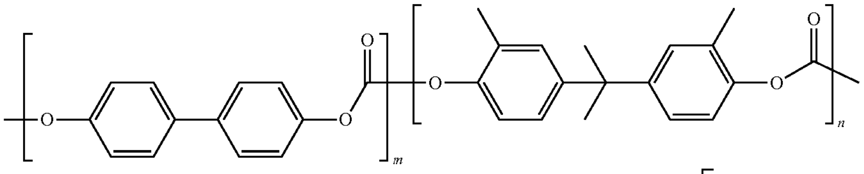

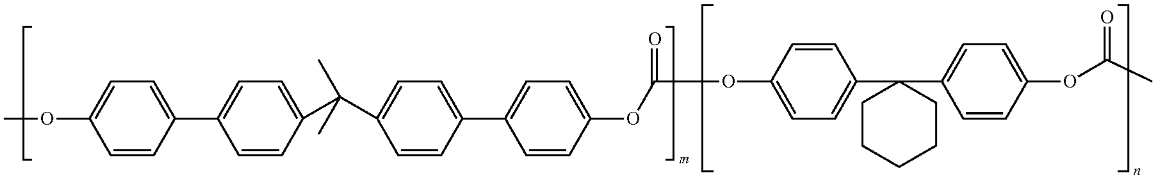

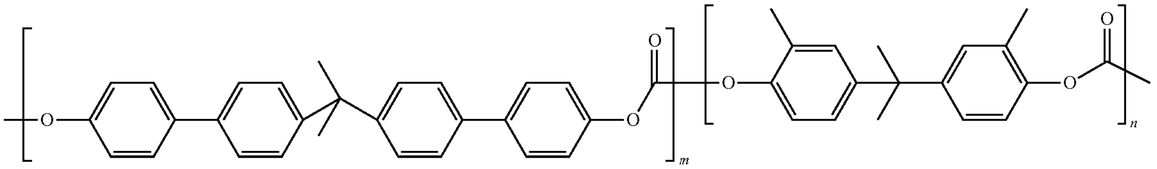

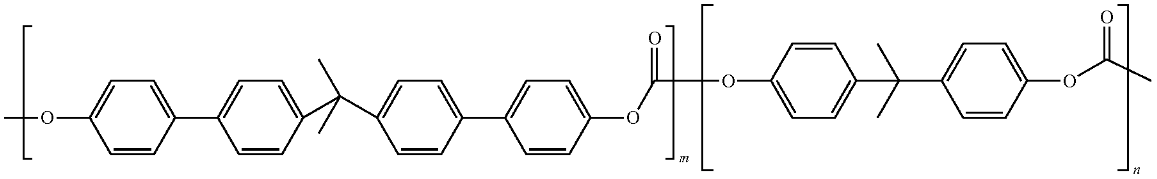

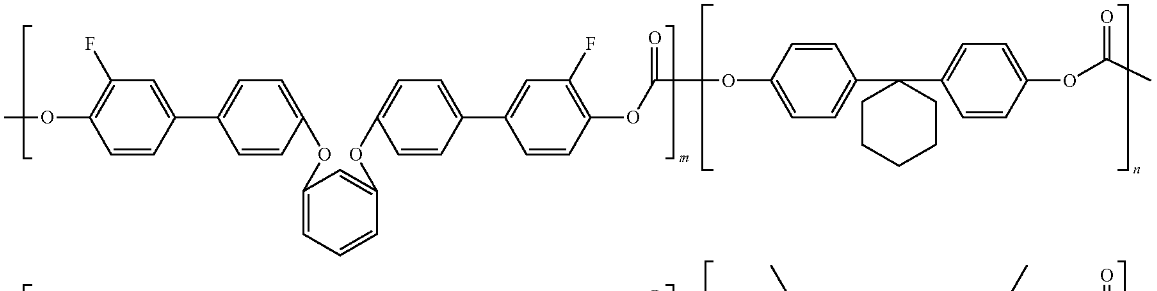

and

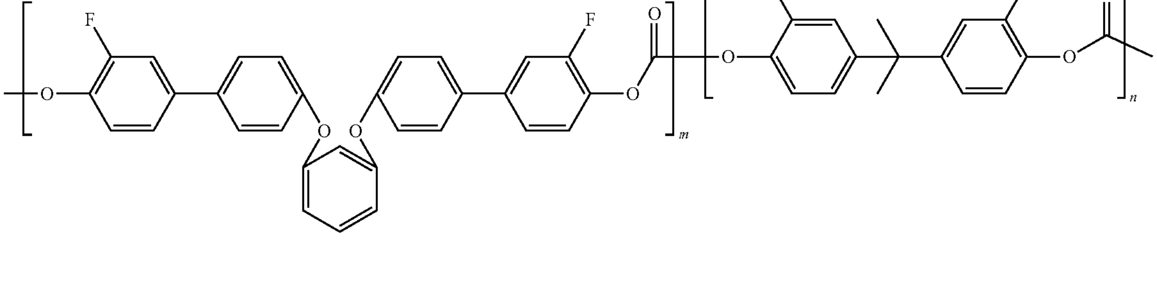

The ratio of m/n in the biaryl polycarbonates formulas structures illustrated herein is for example, from about 1 to about 10, from 1 to about 6, from about 1 to about 4, from about 1 to about 3, or from about 1 to about 2.

The mixtures of the biaryl polycarbonate, conductive filler, and polysiloxane are present in the amounts and ratios indicated herein. Exemplary ratios of the biaryl polycarbonate to conductive filler to polysiloxane are about 80/19.95/0.05, about 85/14.95/0.05, about 90/9.9/0.1, about 87/12.8/0.2, or about 90/9/1, and the like.

Polysiloxane Polymers

The intermediate transfer member can also generally comprise a polysiloxane polymer. Examples of polysiloxane polymers selected for the intermediate transfer members disclosed herein include known suitable polysiloxanes, such as a copolymer of a polyether and a polydimethylsiloxane, commercially available from BYK Chemical as BYK® 333, BYK® 330 (about 51 weight percent in methoxypropylacetate), and BYK® 344 (about 52.3 weight percent in xyiene/isobutanol, ratio of 80/20); BYK®-SILCLEAN 3710 and BYK® 3720 (about 25 weight percent in methoxypropanol); a copolymer of a polyester and a polydimethylsiloxane, commercially available from BYK Chemical as BYK® 310 (about 25 weight percent in xylene), and BYK® 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester poiyether and a polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be included in the polymer layer mixtures in various effective amounts, such as from about 0.01 to about 5 weight percent, from about 0.05 to about 2 weight percent, from about 0.05 to about 0.5 weight percent, from about 0.1 to about 0.5 weight percent, or from about 0.1 to about 0.3 weight percent based on the total weight of the components or ingredients present.

Optional Fillers

Optionally, the intermediate transfer members disclosed herein may contain one or more fillers to, for example, alter and adjust the conductivity of the intermediate transfer member. Where the intermediate transfer member is a one layer structure, the conductive filler can be included in the mixture of the biaryl polycarbonate disclosed herein. However, where the intermediate transfer member is a multi-layer structure, the conductive filler can be included in one or more layers of the member, such as in the supporting substrate, the biaryl polycarbonate layer, or mixtures thereof coated thereon, or in both the supporting substrate and the biaryl polycarbonate layer.

Any suitable filler can be used that provides the desired results. For example, suitable fillers include carbon blacks, metal oxides, polyanilines, graphite, acetylene black, fluorinated carbon blacks, other known suitable fillers, and mixtures of fillers.

Examples of carbon black fillers that can be selected for the intermediate transfer members illustrated herein and where the particle sizes can be determined by an electron microscope and the B.E.T. surface areas can be determined by the standard known one point nitrogen gas physisorption method, include special black 4 (B.E.T. surface area=180 $m^2/g$, DBP absorption=1.8 ml/g, primary particle diameter=25 nanometers) available from Evonik-Degussa, special black 5 (B.E.T. surface area=240 $m^2/g$, DBP absorption=1.41 ml/g, primary particle diameter=20 nanometers), color black FW1 (B.E.T. surface area=320 $m^2/g$, DBP absorption=2.89 ml/g, primary particle diameter=13 nanometers), color black FW2 (B.E.T. surface area=460 $m^2/g$, DBP absorption=4.82 ml/g, primary particle diameter=13 nanometers), color black FW200 (B.E.T. surface area=460 $m^2/g$, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/gf$ DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer members disclosed herein.

Examples of poiyaniline fillers that can be selected for incorporation into the intermediate transfer members are PANIPOL™ F, commercially available from Panipoi Oy, Finland; and known lignosulfonic acid grafted poiyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxides include those antimony doped tin oxides coated on an inert core particle (e.g., ZELEC® ECP-S, M and T), and those antimony doped tin oxides without a core particle (e.g., ZELEC®ECP-3005-XC and ZELEC®ECP-3010-XC; ZELEC® is a trademark of DuPont Chemicals, Jackson Laboratories, Deepwater, N.J.). The core particle may be mica, $TiO_2$ or acicular particles having a hollow or a solid core.

The antimony doped tin oxide particles can be prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide that can be selected for the disclosed intermediate transfer members are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC® ECP-T), and a plate shaped mica core product (ZELEC® ECP-M).

When present, the filler can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 20 weight percent, or from about 5 to about 20 weight percent based on the total of the solid ingredients in which the filler is included.

Optional Additional Polymers

In embodiments of the present disclosure, the intermediate transfer member biaryl polycarbonate layer can further include an optional polymer that primarily functions as a binder. Examples of suitable additional polymers include a polyamideimide, a polyimide, a polyetherimide, a polycarbonate, a polyphenylene sulfide, a polyamide, a polysulfone, a polyetherimide, a polyester, a polyvinylidene fluoride, a polyethylene-co-poytetrafluoroethylene, and the like, and mixtures thereof.

When an additional polymer is selected, it can be included in the intermediate transfer member in any desirable and effective amounts. For example, the additional polymer can be present in an amount of from about 1 to about 75 weight percent, from about 2 to about 45 weight percent, or from about 3 to about 15 weight percent, based on the total of the ingredients.

Optional Supporting Substrates

If desired, a supporting substrate can be included in the intermediate transfer member, such as beneath the polymer layer. The supporting substrate can be included to provide increased rigidity or strength to the intermediate transfer member.

The coating dispersion of the biaryl polycarbonate can be coated on any suitable supporting substrate material to form a dual layer intermediate transfer member. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180 to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000.

Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in Nmethylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217×), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, from about 75 to about 125 microns, from about 80 to about 105 microns, or from about 80 to about 90 microns.

Optional Release Layer

When desired, an optional release layer can be included in the intermediate transfer member, such as in the configuration of a layer over the biaryl polycarbonate layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF® The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITONA®; (2) a class of terpolymers of vinylidenefluoride, hexafluoropropylene, and tetrafluoroethylene, known commercially as VITON B®; and (3) a class of tetrapolymers of vinyiidenefluoride, hexafluoropropylene, tetrafluoroethylene, and a cure site monomer, such as VITON GF®, having 35 mole percent of vinyiidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Intermediate Transfer Member Formation

The biaryl polycarbonate intermediate transfer member, or the mixtures illustrated herein comprising a biaryl polycarbonate, a polysiloxane, and an optional conductive filler component, can be formulated into an intermediate transfer member by any suitable method. For example, with known milling processes, uniform dispersions of the biaryl polycarbonate, or the intermediate transfer member mixtures can be obtained, and then coated on individual metal substrates, such as a stainless steel substrate or the like, using known draw bar coating processes or known flow coating methods. The resulting individual film or films can be dried by heating at, for example, from about 100 to about 400° C., from about 160 to about 320° C., or from about 125 to about 190° C., for a suitable period of time, such as from about 20 to about 180 minutes, from about 40 to about 120 minutes, or from about 25 to about 35 minutes while remaining on the substrates. More specifically, the films formed can be cured by heating at 125° C. for 30 minutes, and 190° C. for 30 minutes.

After drying and cooling to room temperature, about 23 to about 25° C., the films readily release from the steel substrates. That is, the films obtained immediately release, such as for example within from about 1 to about 15 seconds, from about 5 to about 15 seconds, or from about 5 to about 10 seconds, without any external assistance. The resultant intermediate transfer film product can have a thickness of, for example, from about 30 to about 400 microns, from about 15 to about 150 microns, from about 20 to about 100 microns, from about 50 microns to about 200 microns, from about 70 microns to about 150 microns, or from about 25 to about 75 microns.

As metal substrates selected for the deposition of the mixture disclosed herein, there can be selected stainless steel, aluminum, nickel, copper, and their alloys, and other conventional known materials.

Examples of solvents selected for formation of the intermediate transfer member mixtures, which solvents can be selected in an amount of, for example, from about 60 to about 95 weight percent, or from about 70 to about 90 weight percent of the total mixture ingredients, include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent and the diluent are known diluents like aromatic hydrocarbons, ethyl acetate, acetone, cyclohexanone and acetanilide. The ratio of the biaryl polycarbonate to the solvent is for example, about 95/5, about 90/10, about 85/15, or about 80/20.

The intermediate transfer members illustrated herein can be selected for a number of printing and copying systems, inclusive of xerographic printing systems. For example, the disclosed intermediate transfer members can be incorporated into a multi-imaging xerographic machine where each toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

In an image on image transfer, the color toner images are first deposited on the photoreceptor and all the color toner images are then transferred simultaneously to the intermediate transfer member disclosed herein. In a tandem transfer, the toner image is transferred one color at a time from the photoreceptor to the same area of the intermediate transfer member illustrated herein.

Specific embodiments will now be described in detail. These examples are intended to be illustrative, and are not limited to the materials, conditions, or process parameters set forth in these embodiments. All parts are percentages by weight of total solids of all the components unless otherwise indicated.

Comparative Example 1

A coating composition was prepared by admixing with stirring and milling a mixture of special carbon black 4 obtained from Degussa Chemicals, a polyimide of a polyamic acid of pyromellitic dianhydride/4,4'-oxydianiline available as PYRE-M.L.® RC-5019 from Industrial Summit Technology, and the polyester modified polydimethylsiloxane, available as BYK® 333 from BYK Chemical, in a ratio of 14/85.8/0.2 based on the initial mixture feed amounts, in N-methylpyrrolidone, about 13 weight solids. The obtained intermediate transfer member dispersion was coated on a stainless steel substrate of a thickness of 0.5 millimeter, and subsequently the mixture was cured by heating at 125° C. for 30 minutes, 190° C. for 30 minutes, and 320° C. for 60 minutes. The resulting intermediate transfer member comprised of the above components in the ratios indicated did not release from the stainless substrate, but rather adhered to this substrate. After being immersed in water for 3 months, the above obtained intermediate transfer member film obtained eventually released from the substrate.

Comparative Example 2

An intermediate transfer member was prepared by admixing with stirring and milling a mixture of special carbon black 4 obtained from Degussa Chemicals, a polycarbonate, PCZ-400 [poly(4,4'-dihydroxy-diphenyl-1-1-cyclohexane)carbonate, $M_w$=40,000)], available from Mitsubishi Gas Chemical Company, and the polyester modified polydimethylsiloxane, available as BYK® 333 from BYK Chemical, in a ratio of 12.8/87/0.2 based on the initial mixture feed amounts, in THF/toluene=70/30 mixture, about 15 weight solids. The obtained intermediate transfer member dispersion was coated on a stainless steel substrate of a thickness of 0.5 millimeter, and subsequently the mixture was dried by heating at 65° C. for 20 minutes, and 160° C. for 40 minutes. The resulting intermediate transfer member comprised of the above components in the ratios indicated self released from the stainless steel substrate in 15 seconds without the assistance of any external processes.

Example I

An intermediate transfer member was prepared by repeating the process of Comparative Example 2 except that the PCZ-400 was replaced with the biaryl polycarbonate of the following formula/structure and with a ratio of 12.8/87/0.2 carbon black, biaryl carbonate/polydimethylsiloxane.

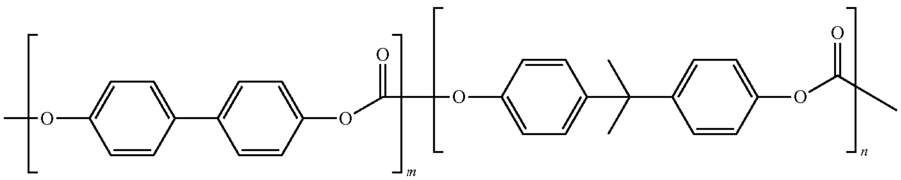

where m is about 20 mole percent, and n is about 80 mole percent, the number average molecular weight is about 38,000 as determined by Gel Permeation Chromatography (GPC) analysis, and obtained as an experimental sample BP20BPA80 polycarbonate from Mitsubishi Gas Chemical Company, inc.

The resulting intermediate transfer member, 80 microns in thickness, with a flat configuration, and with no curl comprised of the above ingredients of the carbon black/biaryl polycarbonate/polyester modified polydimethylsiloxane BYK® 333 in a ratio of 12.8/87/0.2 readily self released from the stainless steel substrate in 15 seconds without the assistance of any external processes.

Example II

An intermediate transfer member is prepared by repeating the process of Example I except there is selected a biaryl polycarbonate of the following formula/structure as obtained from South Dakota School of Mines and Technology, where m is about 20 mole percent, and n is about 80 mole percent, the number average molecular weight is about 8,000 as determined by Gel Permeation Chromatography (GPC) analysis, and the weight average molecular weight is about 20,000 as determined by Gel Permeation Chromatography (GPC) analysis, and with a ratio of 12.7/87/0.3 carbon black, biaryl carbonate/polydimethylsiloxane.

Measurements

The above intermediate transfer members of Example I and the Comparative Example 1 and Comparative Example 2 were measured for Young's Modulus following the known ASTM D882-97 process. Samples (0.5 inch×12 inch) of each intermediate transfer member were placed in a commercially available Instron Tensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results and dividing the tensile stress by the corresponding strain. The tensile stress was calculated by dividing the load by the average cross sectional area of each of the test samples. The results are provided in the following Table.

The surface resistivity of the above intermediate transfer members of Example I, Comparative Example 1, and Comparative Example 2 were measured using a High Resistivity Meter, and the results are provided in the following Table.

TABLE

| | Surface Resistivity (Ohm/Sq) | Young's Modulus Mega Pascals (MPa) | Release From Metal Substrate | Break Strength Modulus Mega Pascals (MPa) |
|---|---|---|---|---|
| Example I: Biaryl Polycarbonate Intermediate Transfer Member | $4.1 \times 10^{10}$ | 3,800 | Self Released in 15 Seconds | 120 |
| Comparative Example 2: Polycarbonate Z Intermediate Transfer Member | $3.7 \times 10^{10}$ | 1,600 | Self Released In 15 Seconds | 50 |

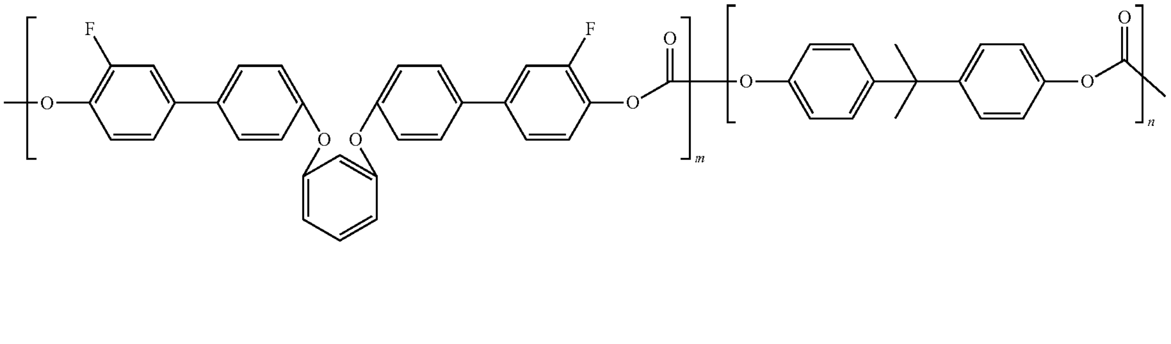

TABLE-continued

| | Surface Resistivity (Ohm/Sq) | Young's Modulus Mega Pascals (MPa) | Release From Metal Substrate | Break Strength Modulus Mega Pascals (MPa) |
|---|---|---|---|---|
| Comparative Example 1: Polyimide Intermediate Transfer Member | $6.2 \times 10^{10}$ | 6,000 | Did Not Release Until After Being Placed in Water for Three Months | 160 |

The disclosed biaryl polycarbonate intermediate transfer member of Example I possessed a Break Strength Young's modulus increase of about 140% versus the Comparative Example 2 polycarbonate Z intermediate transfer member.

The Comparative Example 1 polyimide intermediate transfer member had a Young's modulus of 6,000 and the biaryl polycarbonate intermediate transfer member of Example I possessed a Young's modulus of 3,800, with the Example I intermediate transfer member self releasing in 15 seconds versus no self release for the Comparative Example 1 polyimide intermediate transfer member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a supporting substrate of a polyimide, a polyamideimide, a polyetherimide, or mixtures thereof, and a layer of a mixture of a conductive filler component, a polysiloxane, and a biaryl polycarbonate, and wherein said biaryl polycarbonate is represented by the following formulas/structures wherein m is about 20 mole percent, and n is about 80 mole percent and wherein said biaryl polycarbonate has a number average molecular weight of from about 5,000 to about 100,000, and a weight average molecular weight of from about 8,000 to about 300,000

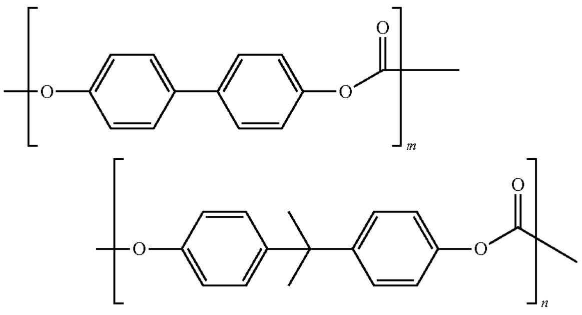

and wherein said member accepts a xerographic developed image and wherein said member possesses a Young's Modulus of from about 2,500 to about 5,000 Mega Pascals, and a break strength of from about 70 to about 150 Mega Pascals, and wherein said polysiloxane is polydimethylsiloxane, the conductive filler is carbon black and the ratio of carbon black, biaryl carbonate/polydimethylsiloxane is 12.8/87/0.2.

2. The intermediate transfer member in accordance with claim 1 wherein m is 20 mole percent, and n is 80 mole percent.

3. The intermediate transfer member in accordance with claim 1 wherein m is 20 mole percent, n is 80 mole percent, and wherein the number average molecular weight of said biaryl carbonate is about 38,000 as determined by Gel Permeation Chromatography.

4. The intermediate transfer member in accordance with claim 1 wherein said polysiloxane is a copolymer of a polyether and a polydimethylsiloxane, a copolymer of a polyester and a polydimethylsiloxane, a copolymer of a polyacrylate and a polydimethylsiloxane, or a copolymer of a polyester polyether and a polydimethylsiloxane.

5. The intermediate transfer member in accordance with claim 1 wherein said member has a resistivity of from about $10^9$ to about $10^{13}$ ohm/square.

6. An intermediate transfer member consisting of a mixture of a biaryl polycarbonate, a polysiloxane, and a conductive filler component, and wherein said member possesses a Young's Modulus of 3,800 Mega Pascals and a break strength Modulus of 120 Mega Pascals, and which mixture is readily releasable from a metal substrate, and wherein said biaryl polycarbonate is represented by the following formulas/structures wherein m is 20 mole percent and n is 80 mole percent, and wherein said biaryl polycarbonate has a number average molecular weight of from about 5,000 to about 100,000, and a weight average molecular weight of from about 8,000 to about 300,000.

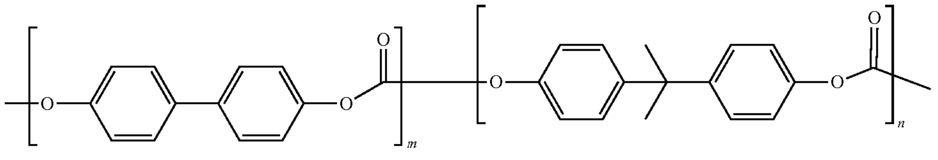

and wherein said member accepts a xerographic toner developed image and wherein said biaryl polycarbonate possesses a glass transition temperature of from about 180° C. to about 300° C.

* * * * *